(12) United States Patent
Kanamarlapudi et al.

(10) Patent No.: US 9,509,448 B2
(45) Date of Patent: Nov. 29, 2016

(54) METHODS AND APPARATUS FOR ENHANCED STATUS RETRANSMISSION

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 13/944,602

(22) Filed: Jul. 17, 2013

(65) Prior Publication Data

US 2014/0082447 A1    Mar. 20, 2014

Related U.S. Application Data

(60) Provisional application No. 61/703,135, filed on Sep. 19, 2012.

(51) Int. Cl.
*H04L 1/08*  (2006.01)
*H04L 1/18*  (2006.01)

(52) U.S. Cl.
CPC ............. *H04L 1/08* (2013.01); *H04L 1/1848* (2013.01); *H04L 1/188* (2013.01); *H04L 1/1809* (2013.01); *H04L 1/1812* (2013.01); *H04L 1/1819* (2013.01)

(58) Field of Classification Search
CPC . H04L 1/1809; H04L 1/1812; H04L 1/1887; H04L 1/1819; H04L 1/188; H04L 1/08; H04L 1/1848
See application file for complete search history.

(56) References Cited

U.S. PATENT DOCUMENTS 7,525,908 B2    4/2009   Olsson et al.
8,295,839 B2 *  10/2012  Terry ............................. 455/436
2002/0191544 A1  12/2002 Cheng
(Continued)

FOREIGN PATENT DOCUMENTS

EP       1641190 A1      3/2006
WO       WO-00052873     9/2000
WO       WO-2009132276 A2  10/2009

OTHER PUBLICATIONS

International Search Report and Written Opinion—PCT/US2013/060366—ISA/EPO—Dec. 17, 2013.
(Continued)

*Primary Examiner* — Esaw Abraham
*Assistant Examiner* — Kyle Vallecillo
(74) *Attorney, Agent, or Firm* — Ashish L. Patel; Ryan Farr

(57) ABSTRACT

Methods and apparatus of enhanced status retransmission in wireless communication include receiving at least a first portion of a reconfiguration message from a network entity. The methods and apparatus further include detecting an absent second portion of the reconfiguration message. Moreover, the methods and apparatus include sending a retransmission request to the network entity based at least in part on the detecting of the absent second portion of the reconfiguration message and irrespective of a state of a status prohibit timer. Additionally, The methods and apparatus include triggering a status prohibit timer disregard state for at least a portion of a status prohibit time period of the status prohibit timer, wherein the status prohibit timer disregard state permits the sending of the retransmission request during the status prohibit timer period.

33 Claims, 9 Drawing Sheets

(56) References Cited

U.S. PATENT DOCUMENTS

| | | |
|---|---|---|
| 2003/0112806 A1 | 6/2003 | Kim |
| 2005/0078674 A1 | 4/2005 | Koide et al. |
| 2006/0013257 A1 | 1/2006 | Vayanos |
| 2007/0047452 A1 | 3/2007 | Lohr et al. |
| 2009/0052402 A1* | 2/2009 | Sachs ............ H04L 1/1671 370/331 |
| 2009/0086656 A1* | 4/2009 | Kuchibhotla ........ H04L 47/10 370/310 |
| 2009/0268683 A1* | 10/2009 | Ho et al. ............... 370/329 |
| 2010/0118779 A1 | 5/2010 | Umesh et al. |
| 2010/0135249 A1 | 6/2010 | Meyer et al. |
| 2011/0103377 A1 | 5/2011 | Hua et al. |
| 2011/0223900 A1 | 9/2011 | Yu et al. |
| 2012/0020213 A1* | 1/2012 | Horneman ........ H04W 76/043 370/231 |
| 2012/0218953 A1 | 8/2012 | Zirwas et al. |
| 2013/0189990 A1* | 7/2013 | Kim ............... H04W 36/30 455/436 |
| 2014/0177464 A1 | 6/2014 | Kanamarlapudi et al. |

OTHER PUBLICATIONS

3rd Generation Partnership Project, "Radio Link Control (RLC) protocol specification (Release 6)," 3GPP TS 25.322 V6.0.0 (Dec. 2003).

* cited by examiner

METHODS AND APPARATUS FOR ENHANCED STATUS RETRANSMISSION

CLAIM OF PRIORITY UNDER 35 U.S.C. §119

The present Application for Patent claims priority to Provisional Application No. 61/703,135 entitled "Enhanced Status Retransmission Techniques to Improve Call Performance" filed Sep. 19, 2012, and assigned to the assignee hereof and hereby expressly incorporated by reference herein.

BACKGROUND

Field

Aspects of the present disclosure relate generally to wireless communication systems, and more particularly, to enhanced status retransmission.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication systems, communication restrictive parameters, particularly communication restrictions between a receiver and transmitter, may often lead to degradations in wireless communication. Even more, the communication restrictive parameters inhibit wireless devices from achieving higher wireless communication quality through, for example, less restrictive communication parameters. Thus, improvements in retransmission techniques are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of enhanced status retransmission in wireless communication comprises receiving at least a first portion of a reconfiguration message from a network entity. The method further comprises detecting an absent second portion of the reconfiguration message. Moreover, the method comprises sending a retransmission request to the network entity based at least in part on the detecting of the absent second portion of the reconfiguration message and irrespective of a state of a status prohibit timer. Additionally, the method comprises triggering a status prohibit timer disregard state for at least a portion of a status prohibit time period of the status prohibit timer, wherein the status prohibit timer disregard state permits the sending of the retransmission request during the status prohibit timer period.

Further aspects provide a computer program product for enhanced status retransmission in wireless communication comprising a computer-readable medium includes at least one instruction for receiving at least a first portion of a reconfiguration message from a network entity. The computer program product further comprises at least one instruction for detecting an absent second portion of the reconfiguration message. Moreover, the computer program product comprises at least one instruction for sending a retransmission request to the network entity based at least in part on the detecting of the absent second portion of the reconfiguration message and irrespective of a state of a status prohibit timer. Additionally, the computer program product comprises at least one instruction for triggering a status prohibit timer disregard state for at least a portion of a status prohibit time period of the status prohibit timer, wherein the status prohibit timer disregard state permits the sending of the retransmission request during the status prohibit timer period.

Additional aspects provide an apparatus for enhanced status retransmission in wireless communication comprises means for receiving at least a first portion of a reconfiguration message from a network entity. The apparatus further comprises means for detecting an absent second portion of the reconfiguration message. Moreover, the apparatus comprises means for sending a retransmission request to the network entity based at least in part on the detecting of the absent second portion of the reconfiguration message and irrespective of a state of a status prohibit timer. Additionally, the apparatus comprises means for triggering a status prohibit timer disregard state for at least a portion of a status prohibit time period of the status prohibit timer, wherein the status prohibit timer disregard state permits the sending of the retransmission request during the status prohibit timer period In an additional aspect, an apparatus for enhanced status retransmission in wireless communication comprises a communication component configured to receive at least a first portion of a reconfiguration message from a network entity. The apparatus further comprises a reconfiguration message detection component configured to detect an absent second portion of the reconfiguration message. Moreover, the apparatus comprises a retransmission request component configured to send a retransmission request to the network entity based at least in part on the detecting of the absent second portion of the reconfiguration message and irrespective of a state of a status prohibit timer. Additionally, the reconfiguration message detection component is further configured to trigger a status prohibit timer disregard state for at least a portion of a status prohibit time period of the status prohibit timer, wherein the status prohibit timer disregard state permits the sending of the retransmission request during the status prohibit timer period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhanced status retransmission. Specifically, some user equipments (UEs) may be configured to limit communication of retransmission requests to a network entity. For instance, during mobility scenarios (e.g., crossing cell coverage boundaries) resulting in communication of a reconfiguration message (e.g., physical channel reconfiguration) from a network entity to a UE, the UE, due to poor network conditions, may not receive a complete reconfiguration message. In such scenarios, the UE may communicate a retransmission request to the network entity requesting retransmission of at least missing portions of the reconfiguration message. However, upon communication of the retransmission request to the network entity, the UE may not be permitted to communicate a subsequent retransmission request for a period of time. That is, for example, the UE may be prohibited from communicating a subsequent retransmission request until expiration of a timer.

However, in such instances, frequent communication of retransmission requests to the network entity may be vital to ensure call continuation. As such, such limitations are especially detrimental to established call sessions, which may experience call drop as a result of the inability by the UE to successfully complete reconfiguration within, for instance, a reconfiguration time period. Accordingly, in some aspects, the present methods and apparatuses may provide an efficient solution, as compared to current solutions, to enhance call quality by increasing the frequency of retransmission requests communicated to a network entity.

Figure 1:
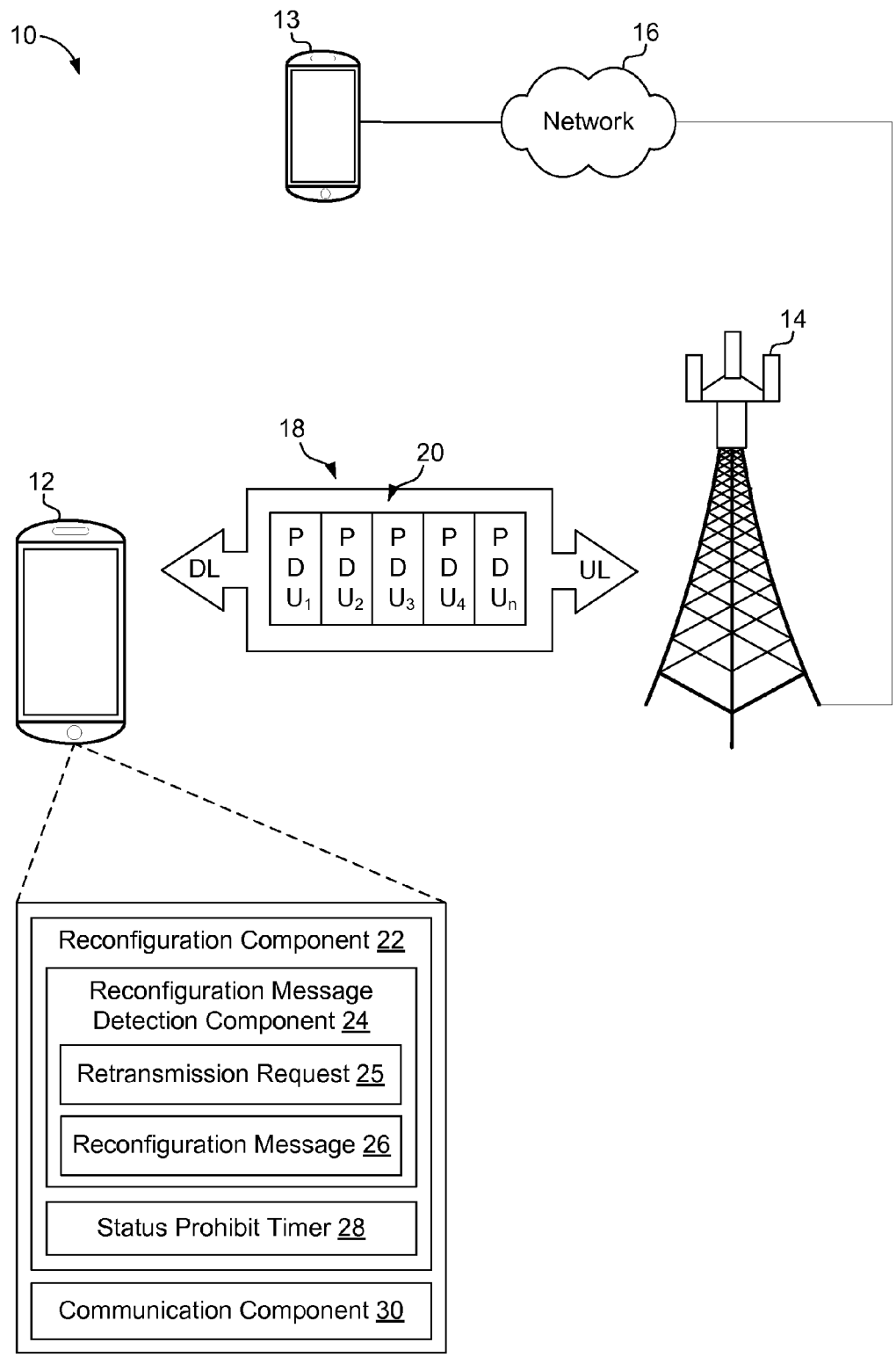
FIG. 1 is a schematic diagram of a communication network including an aspect of a user equipment that may enhance status retransmissions.

Referring to FIG. 1, in one aspect, a wireless communication system 10 includes at least one UE 12 in communication coverage of at least one network entity 14 (e.g., base station). For instance, UE 12 may communicate with network 16 by way of network entity 14. Further, network 16 may facilitate communication between UE 12 and second UE 13. For example, UE 12 may conduct data and/or voice communication with second UE 13. Moreover, UE 12 may communicate with network entity 14 via one or more communication channels 18 utilizing one or more air interfaces. In such aspects, the one or more communication channels 18 may enable communication on one or both of the uplink and the downlink. Further, communication on the one or more communication channels 18 may include communication of one or more PDUs 20. For instance, PDUs 20 may include radio link control (RLC) acknowledgement mode (AM) PDUs.

In some aspects, UEs 12 and 13 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 14 may be a macrocell, picocell, femtocell, relay, Node B, mobile Node B, UE (e.g., communicating in peer-to-peer or ad-hoc mode with UEs 12 and 13), or substantially any type of component that can communicate with UEs 12 and 13 to provide wireless network access at the UEs 12 and 13. In some aspects, UE 13 may be the same as or similar to UE 12.

According to the present aspects, UE 12 may include reconfiguration component 22, which may be configured to reconfigure communication (e.g., physical channel reconfiguration) with a network entity in response to receiving a reconfiguration message from the network entity. For instance, reconfiguration component 22 may be configured to obtain or otherwise receive at least a first portion of a reconfiguration message 26 from network entity 14. The first portion may be any one or more of plurality of PDUs 20 (e.g., $PDU_1$, $PDU_2$, $PDU_3$, $PDU_4$, $PDU_n$), where n is a positive integer. Further, PDUs 20 may include one or both of signaling radio bearer (SRB) data and data radio bearer (DRB) data. However, in some cases, not all of the PDUs 20 forming the reconfiguration message may be received at UE 12. Such cases may lead to poor wireless service experiences, such as call drops, when PDUs containing SRB data for facilitating configuration are not received. Hence, to address such deficiencies, reconfiguration component 22 may include reconfiguration message detection component 24.

In an aspect, reconfiguration message detection component 24 may be configured to detect an absent second portion of the reconfiguration message 26. For instance, reconfiguration message detection component 24 may detect one or more missing PDUs from the communicated PDUs 20 forming an absent second portion of the reconfiguration message 26. In other words, during reconfiguration (e.g., physical channel reconfiguration), the reconfiguration message 26 transmitted by network entity 14 to UE 12, may not be received by UE 12 in its entirety due to poor network conditions. As such, reconfiguration message detection component 24 may detect or otherwise determine the absent second portion (e.g., one or more missing PDUs).

It should be noted that "second portion" as used in this case does not restrict the absent second portion of the plurality of PDUs 20 to be later in sequence or later in time relative to a received first portion of the plurality of PDUs 20. In some aspects, for instance, the absent second portion may be any one or more of the plurality of PDUs 20 (e.g., $PDU_1$, $PDU_2$, $PDU_3$, $PDU_4$, $PDU_n$) not received by UE 12 from network entity 14. Upon detection of an absent second portion, reconfiguration message detection component 24 may be configured to send one or more retransmission requests 25 to the network entity 14 to request retransmission of at least the missing PDUs forming the absent second portion. In some aspects, the one or more retransmission requests 25 may be one or more status PDUs.

In further aspects, reconfiguration component 22 may include status prohibit timer 28, which may be configured to prohibit communication of retransmission requests from UE 12 to network entity 14 during a status prohibit time period 56. In other words, during the status prohibit time period 56, conventional aspects prevented UE 12 from sending a plurality of retransmission requests 25, for example, in order to conserve bandwidth and/or conserve communication resources. However, as will be described in further detail below, aspects of the reconfiguration component 22 include various component and/or subcomponents that enable the sending of one or more retransmission requests 25 irrespective of state of status prohibit timer 28, e.g., no matter if status prohibit time period is still in effect or otherwise has not yet expired.

In additional aspects, UE 12 may include communication component 30, which may be configured to transmit and receive data and/or voice communication (e.g., PDUs 20) on one or more communication channels 18 with one or more network entities (e.g., network entity 14). For example, in an aspect, the communication component 30 may receive at least one reconfiguration message 26 from one or more network entities (e.g., network entity 14), and/or may transmit one or more retransmission requests 25 to the network entity. Further, communication component 30 may include, but is not limited to, one or more of a transmitter, a receiver, a transceiver, protocol stacks, transmit chain components, and receive chain components.

Figure 2:
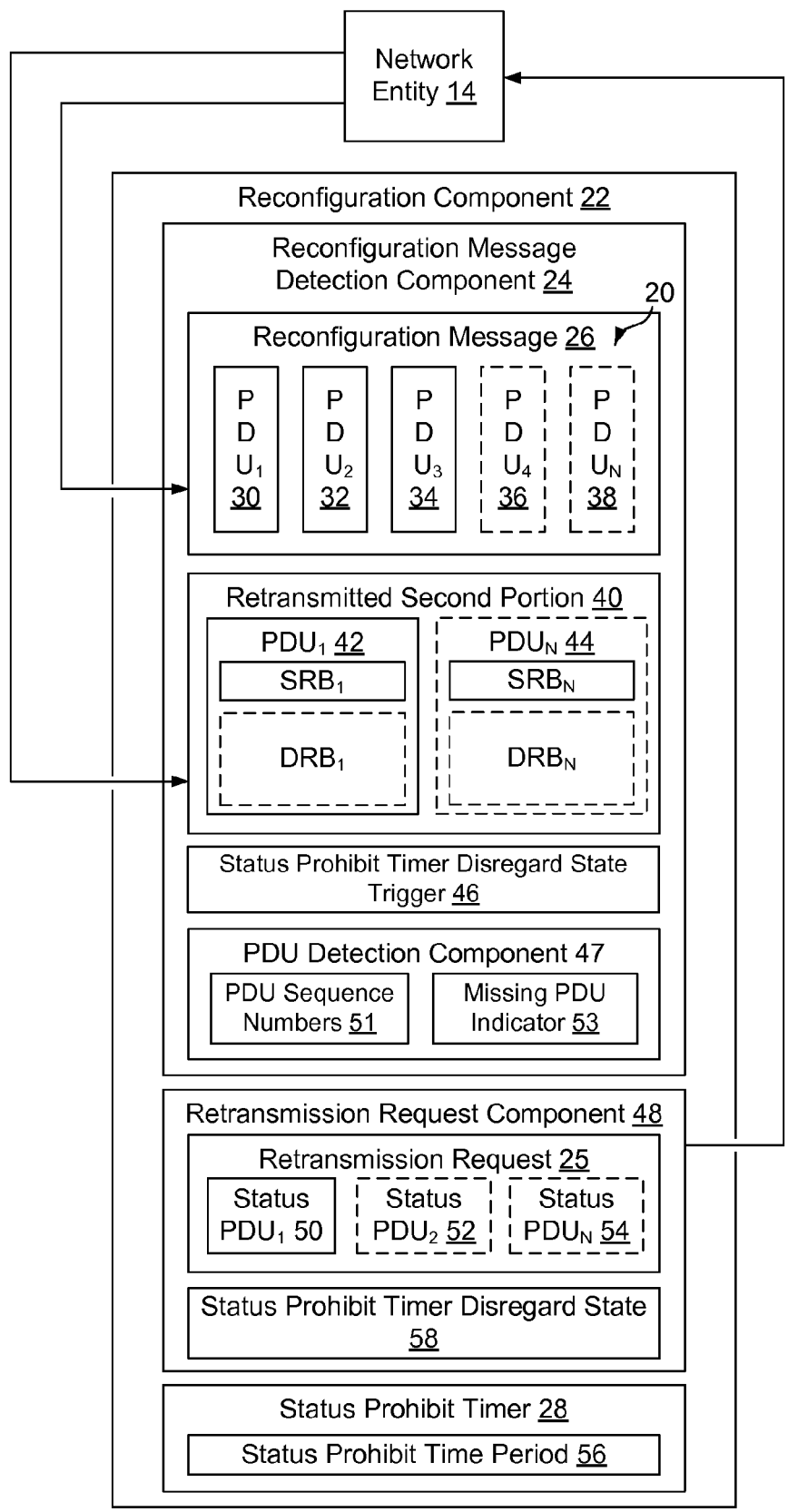
FIG. 2 is a schematic diagram of an aspect of the reconfiguration component of FIG. 1.

Referring to FIG. 2, an aspect of the reconfiguration component 22 may include various components and/or subcomponents, which may be configured to facilitate enhanced reconfiguration (e.g., physical channel reconfiguration). For instance, reconfiguration component 22 may enhance reconfiguration during a call session by increasing the frequency of retransmission requests communicated to a network entity when one or more missing PDUs forming an absent second portion are detected. In such instances, reconfiguration component 22 may be configured to effectively disregard status prohibit timer 28, and hence, communicate one or more retransmission requests (e.g., status PDUs) to network entity 14 during a state of status prohibit timer 28 when status prohibit time period 56 is in effect or otherwise has not expired. The various component/subcomponents described herein enable reconfiguration component 22 to achieve such enhanced reconfigurations.

In an aspect, reconfiguration component 22 may include reconfiguration message detection component 24. For instance, reconfiguration message detection component 24 may be configured to receive and/or decode at least one of a first portion and a second portion of a reconfiguration message 26 from a network entity, where a non-received or non-decoded portion of reconfiguration message 26 may be referred to as an absent second portion. In a non-limiting case, for example, a first portion of the reconfiguration message 26 may include $PDU_1$ 30, $PDU_2$ 32 and $PDU_3$ 34. Further, in a non-limiting example, the absent second portion may include $PDU_4$ 36 and $PDU_n$ 38, with n being any number greater than four. It should be understood that any one or any combination of the PDUs shown as part of, or forming reconfiguration message 26 may be considered as either the first portion or second absent portion.

Further, reconfiguration message detection component 24 may include PDU detection component 47, which may be configured to detect at least an absent second portion of the reconfiguration message 26. For instance, PDU detection component 47 may detect one or more missing PDUs (e.g., $PDU_4$ 36, $PDU_n$ 38) forming an absent second portion of the reconfiguration message 26. PDU detection component 47 may employ various detection techniques to detect or otherwise determine missing PDUs forming an absent second portion.

For example, in some aspects, PDU detection component 47 may detect the absent second portion by determining one or more missing PDU sequence numbers forming the reconfiguration message 26. For instance, in aspects where $PDU_1$ 30, $PDU_2$ 32 and $PDU_4$ 36 are received and form the first portion of reconfiguration message 26, PDU detection component 47 may determine that at least $PDU_3$ 34 is missing based on its absence using, for example, the PDU sequence numbers 51. Further, in other aspects, or in conjunction with the previous aspect, PDU detection component 47 may detect the absent second portion by determining one or more missing PDUs based at least on a missing PDU indicator 53. In such aspects, the missing PDU indicator 53 indicates at least an approximate size or duration in the time domain of one or more PDUs forming the reconfiguration message 26. For example, in aspects where $PDU_1$ 30, $PDU_2$ 32 and $PDU_3$ 34 are received and form the first portion, PDU detection component 47 may determine, based on the missing PDU indicator 53 and a sum of the size of $PDU_1$ 30, $PDU_2$ 32 and $PDU_3$ 34, that at least $PDU_4$ 36 is missing.

In further aspects, upon detection of one or more missing PDUs (e.g., $PDU_4$ 36) forming the absent second portion, reconfiguration component 22 may, via communication component 30 (FIG. 1), configure retransmission request component 48 to transmit one or more retransmission requests 25 to network entity 14. For example, the one or more retransmission requests 25 may be in the form of one or more status PDUs. In some aspects, one or more status PDUs may include Status $PDU_1$ 50, Status $PDU_2$ 52, and Status $PDU_n$ 54, where n is any number greater than three.

For instance, a status PDU (e.g., Status $PDU_1$ 50) may inform the network entity (e.g., network entity 14) the acknowledgment information of the one or more RLC (Acknowledge Mode) PDUs (e.g., PDUs forming reconfirmation message 26) received at reconfiguration component 22. In other words, a status PDU may indicate to the network entity in communication with UE the PDUs not received by the UE (e.g., absent or missing $PDU_4$ 36). As such, retransmission request component 48 may be configured to continuously or periodically transmit one or more retransmission requests 25 in the form of status PDUs (e.g., Status $PDU_1$ 50) to indicate the absent or missing PDUs (e.g., $PDU_4$ 36). Each status PDU transmitted to the network entity may indicate the same or different absent or missing PDU(s). For instance, regardless of whether some of absent or missing PDU(s) have been retransmitted to UE 12 in response to a status PDU (e.g., Status $PDU_1$ 50) received by network entity 14, UE 12 may continue to periodically transmit subsequent status PDU(s) (e.g., Status $PDU_2$ 52) to network entity 14 indicating the same absent or missing PDU information (e.g., SRB data).

Moreover, upon detection of one or more missing PDUs (e.g., $PDU_4$ 36) forming the absent second portion, reconfiguration message detection component 24 may be configured to send or otherwise provide status prohibit timer disregard state trigger 46 to retransmission request component 48 to initialize a status prohibit timer disregard state 58. In an aspect, for example, status prohibit timer disregard state 58 comprises a configuration or operating state of retransmission request component 48 that allows retransmission request component 48 to send one or more retransmission requests, e.g., status PDUs, to network entity 14 to request retransmission of at least one or more missing PDUs, e.g., the determined absent second portion of reconfiguration message 26 from network entity 14 irrespective of status prohibit timer 28 and/or the status prohibit time period 56. Further, in some aspects, the sending of the status prohibit timer disregard state trigger 46 to initialize status prohibit timer disregard state 58 may be done concurrently with the sending of Status $PDU_1$ 50 to network entity 14.

However, rather than waiting until an expiration of status prohibit time period 56, retransmission request component 48 operating in status prohibit timer disregard state 58 may be enabled or otherwise configured to periodically transmit subsequent status PDUs (e.g., Status $PDU_2$ 52) during the status prohibit time period 56. In some aspects, retransmission request component 48 may send a status PDU periodically for every defined time interval (e.g., every TTI). Hence, retransmission request component 48 operating in the status prohibit timer disregard state 58 may transmit a plurality of status PDUs (e.g., Status $PDU_1$ 50, Status $PDU_2$ 52, Status $PDU_3$ 54) to the network entity 14, each indicating some or all of the absent or missing PDU(s) (e.g., $PDU_4$ 36).

Accordingly, operating in status prohibit timer disregard state 58 may effectively enable reconfiguration component 22, and in particular, retransmission request component 48, to disregard status prohibit timer 28 during the status prohibit time period 56 and/or until a complete reconfiguration message 26 is determined to have been formed and/or received. In some aspects, for example, reconfiguration message 26 may be considered complete when all SRBs forming the reconfiguration message 26 have received. However, it should be understood that the retransmission request 25 described herein may request retransmission of one or both of SRBs and DRBs. Further, it should be understood that status prohibit timer 28 may be any timer which prohibits or otherwise prevents the communication of retransmission requests to a network entity until the expiration of some timer.

In further aspects, in response to sending one or more status PDUs to network entity 14, reconfiguration component 22, and more specifically, reconfiguration message detection component 24, may be configured to receive or otherwise obtain retransmitted second portion 40. For example, retransmitted second portion 40 may include at least $PDU_1$ 42, which may contain at least $SRB_1$ and optionally $DRB_1$. Upon receiving the retransmitted second portion 40, reconfiguration message detection component 24 may again detect or otherwise determine whether one or more missing PDUs forming the absent second portion remain missing or absent. When reconfiguration message detection component 24 detects or otherwise determines that the absent second portion has been received, and/or that a complete reconfiguration message 26 is formed, it may instruct retransmission request component 48 to halt the retransmission requests.

Figure 3:
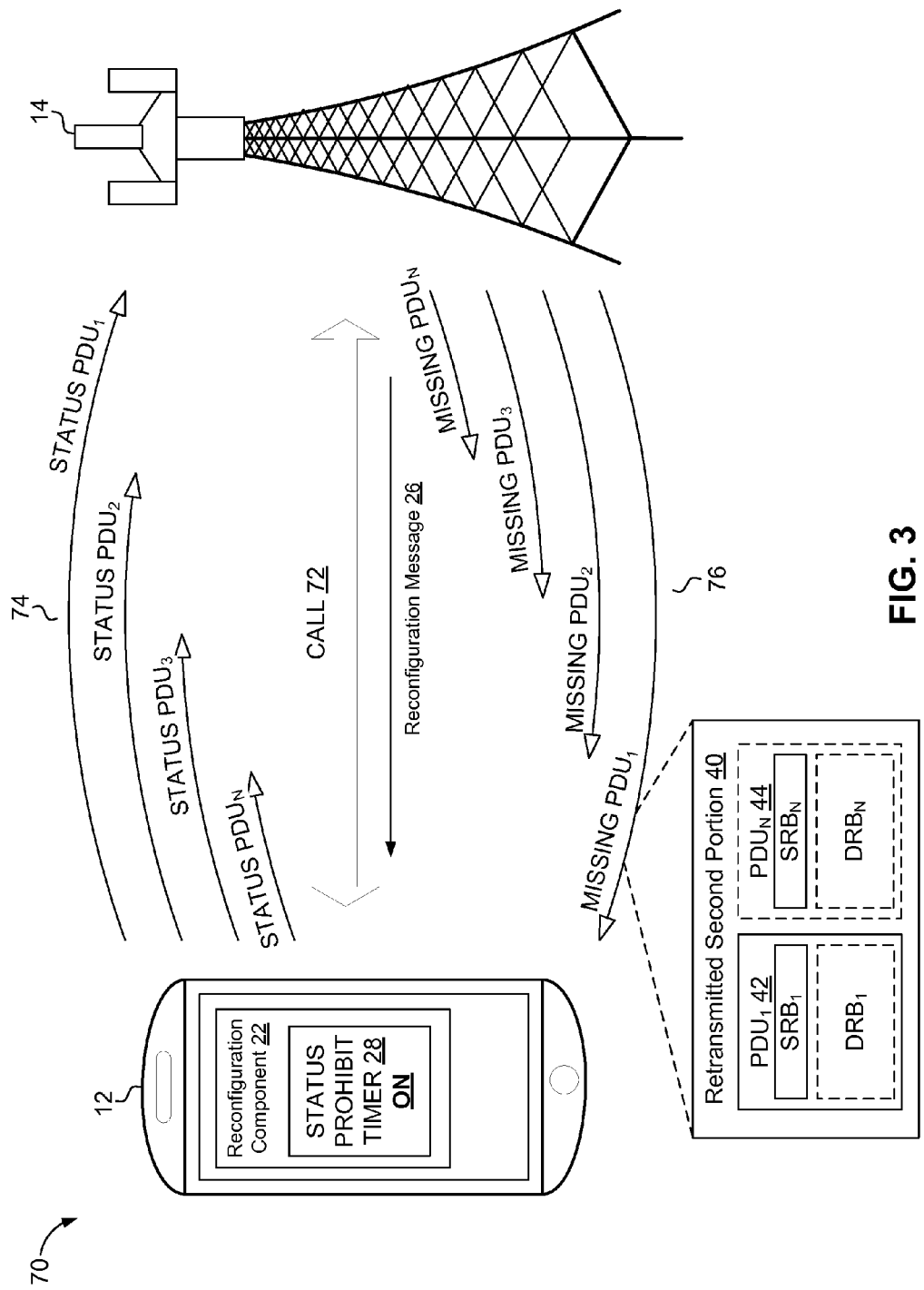
FIG. 3 is a conceptual diagram of a status retransmission communication arrangement between a user equipment and a network entity, according to FIG. 1.

Referring to FIG. 3, an example conceptual diagram of a reconfiguration event is illustrated. In this example, a call 72 between UE 12 and another UE (e.g., second UE 13, FIG. 1) is established and/or is ongoing via network entity 14. Further, due to mobility scenarios, network entity 14 may send UE 12 reconfiguration message 26. However, as a result of poor network conditions and/or poor connection, reconfiguration message 26 may not have been received in its entirety, and/or may not have been properly decoded, at UE 12. That is, one or more missing PDUs forming an absent second portion are detected by reconfiguration component 22. Thus, reconfiguration component 22 may send a first status PDU (Status $PDU_1$) indicating or otherwise identifying the one or more missing PDUs forming the absent second portion.

Upon transmission of Status $PDU_1$, status prohibit timer 28 may be initiated or turned on for status prohibit time period 56, which prohibits further status transmissions until expiration of status prohibit timer 28 and/or status prohibit time period 56. However, in cases of an ongoing call or communication session, according to the present aspects, to the present apparatus and methods may effectively disregard the status prohibit timer 28 to ensure successful reconfiguration and call preservation. Hence, in these aspects, reconfiguration component 22 may send subsequent status PDUs (e.g., Status $PDU_2$, Status $PDU_3$, Status $PDU_n$) even when the status prohibit timer 28 is activated. Further, network entity 14 may, upon receiving one or more status PDUs, transmit at least the missing PDUs (e.g., Missing $PDU_1$) to UE 12. Reconfiguration component 22 may continue sending status PDUs to network entity until a complete reconfiguration message 26 is received (e.g., missing PDUs received), even when status prohibit timer 28 is activated and/or when status prohibit time period 56 has not expired.

Figure 4:
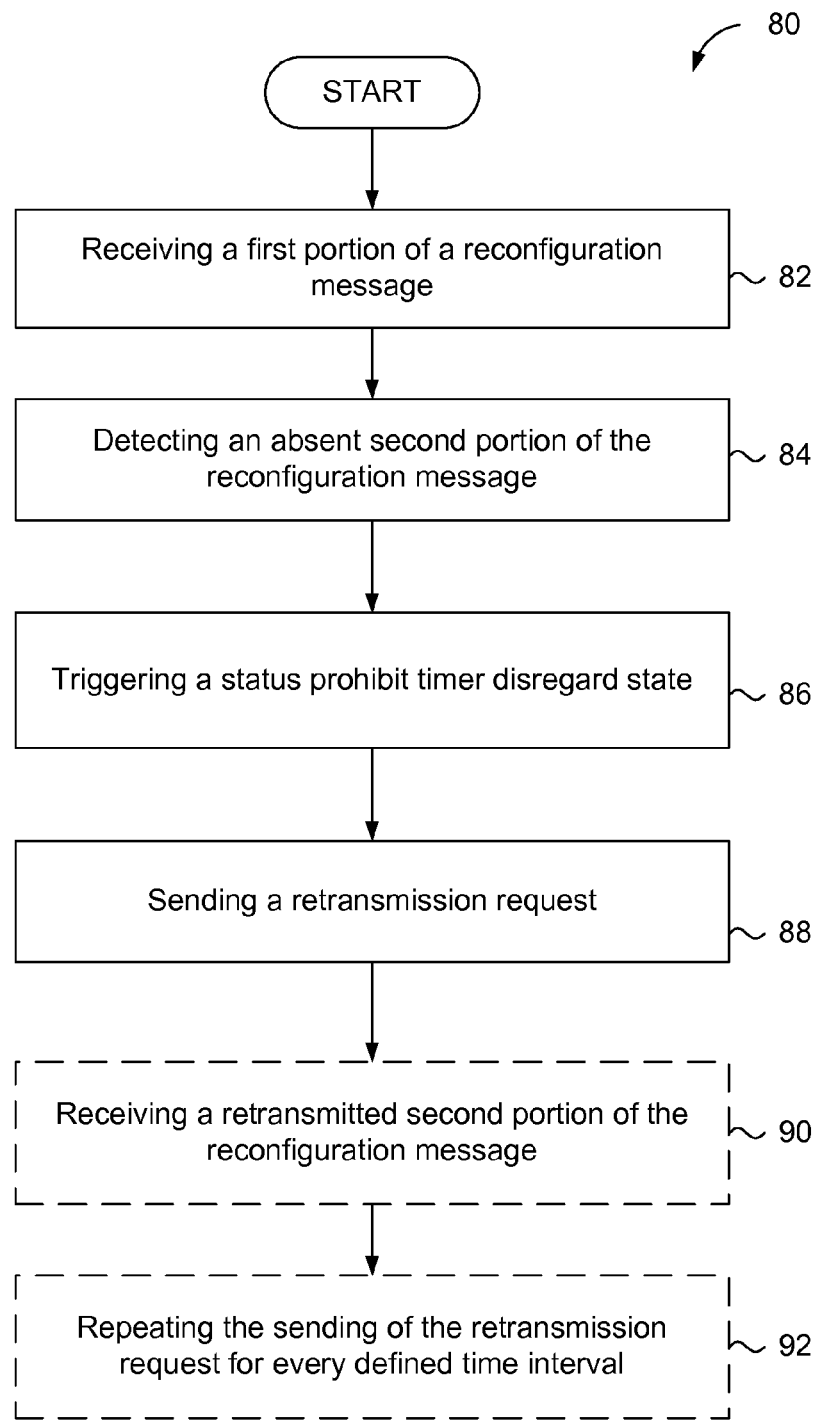
FIG. 4 is a flowchart of an aspect of the status retransmission features at a user equipment, according to FIG. 1.

Referring to FIG. 4, in operation, a UE such as UE 12 (FIG. 1) may perform one aspect of a method 80 for enhancing status retransmission. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 82, method 80 includes receiving a first portion of a reconfiguration message. For example, as described herein, UE 12 may execute reconfiguration component 22 (FIGS. 1 and 2) to receive at least a first portion (e.g., $PDU_1$ 30, $PDU_2$ 32 and/or $PDU_3$ 34) of a reconfiguration message 26 from a network entity 14. In some aspects, the first portion of the reconfiguration message 26 may be communicated within one or more RLC AM PDUs. Further, one or more PDUs (e.g., $PDU_1$ 30, $PDU_2$ 32 and/or $PDU_3$ 34) forming the first portion may include at least one of signaling radio bearer (SRB) data and data radio bearer (DRB) data.

Moreover, at block 84, method 80 includes detecting an absent second portion of the reconfiguration message. For instance, as described herein, reconfiguration component 22 (FIGS. 1 and 2) may execute reconfiguration message detection component 24 to detect an absent second portion (e.g., $PDU_4$ 36) of the reconfiguration message 26. In an aspect, the absent second portion of the reconfiguration message 26 may be communicated within one or more RLC AM PDUs. Further, one or more PDUs (e.g., $PDU_4$ 36) forming the absent second portion may include at least one of signaling radio bearer (SRB) data and data radio bearer (DRB) data.

Additionally, in some aspects, detecting the absent second portion may include determining one or more missing PDU sequence numbers in a defined range of PDU sequence number forming the reconfiguration message. In other aspects, or in conjunction with the previous aspect, detecting the absent second portion may include determining one or more missing PDUs based at least on a PDU sequence timer.

At block 86, method 80 may include triggering a status prohibit timer disregard state. For example, as described herein, upon detecting an absent second portion of the reconfiguration message 26 (FIGS. 1 and 2), reconfiguration message detection component 24 may initiate status prohibit timer disregard state 58 based at least on status prohibit timer disregard state trigger 46. In some aspects, the status prohibit timer disregard state permits the sending of one or more retransmission requests during the status prohibit time period 56 of the status prohibit timer 28.

Further, at block 88, method 80 includes sending a retransmission request. For instance, as described herein, reconfiguration component 22 (FIGS. 1 and 2) may execute retransmission request component 48 to send one or more retransmission requests to network entity 14 based at least in part on the detecting of the absent second portion (e.g., $PDU_4$ 36) of the reconfiguration message 26 and irrespective of a state of status prohibit timer 28. In some aspects, sending the retransmission request may include sending one or more status PDU (e.g., Status $PDU_1$ 50) to the network entity 14. In such aspects, the status PDU requests the network entity 14 retransmit at least the absent second portion of the reconfiguration message 26. In other aspects, the sending of the status PDU occurs prior to an expiration of the status prohibit timer 28.

Additionally, at block 90, method 80 may optionally include receiving a retransmitted second portion of the reconfiguration message. For example, as described herein, reconfiguration component 22 (FIGS. 1 and 2) may execute reconfiguration message detection component 24 to receive one or more retransmitted second portions (e.g., $PDU_1$ 42) of the reconfiguration message 26 in response to sending one or more retransmission requests (e.g., Status $PDU_1$ 50) to the network entity 14.

At block 92, method 80 may optionally include repeating the sending of the retransmission request for every defined time interval. For instance, as described herein, reconfiguration component 22 (FIGS. 1 and 2) may execute retransmission request component 48 to repeat the sending of the retransmission request (e.g., Status $PDU_1$ 50) for every defined time interval (e.g., every TTI) until a complete configuration message is obtained.

Figure 5:
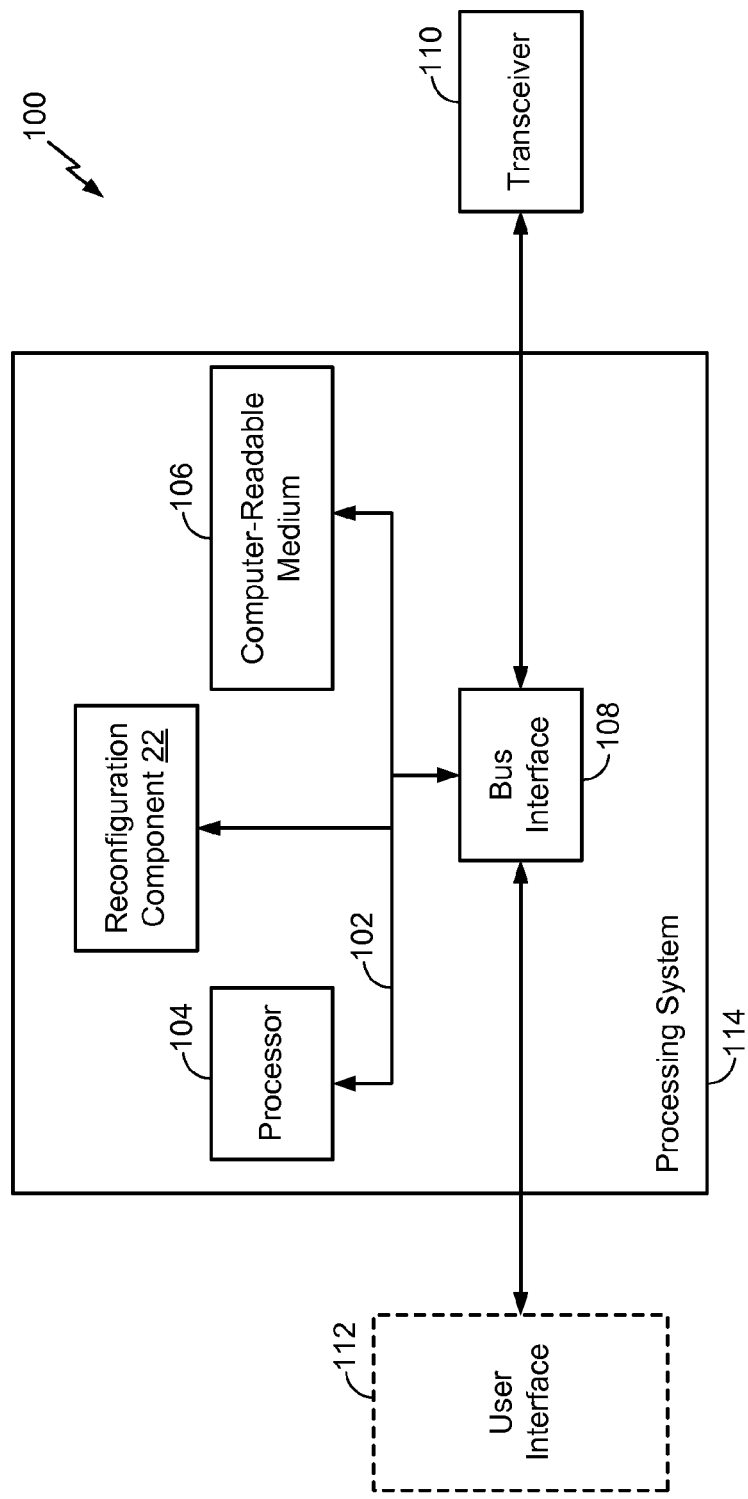
FIG. 5 is a block diagram illustrating an example of a hardware implementation for an apparatus employing a processing system, according to FIG. 1.

FIG. 5 is a block diagram illustrating an example of a hardware implementation for an apparatus 100 employing a processing system 114, wherein the system may be the same as or similar to UE 12 executing reconfiguration component 22 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106 and UE components (e.g., UE 12), such as reconfiguration component 22 (FIG. 1).

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, reconfiguration component 22 (FIG. 1) may be implemented by any one or more of processor 104 and computer-readable medium 106. For example, the processor and/or computer-readable medium 106 may be configured to, via reconfiguration component 22, detect absent portions of reconfiguration messages and send one or more retransmission requests in a wireless communications device (e.g., UE 12).

The various concepts presented throughout this disclosure may be implemented across a broad variety of telecommunication systems, network architectures, and communication standards.

Figure 6:
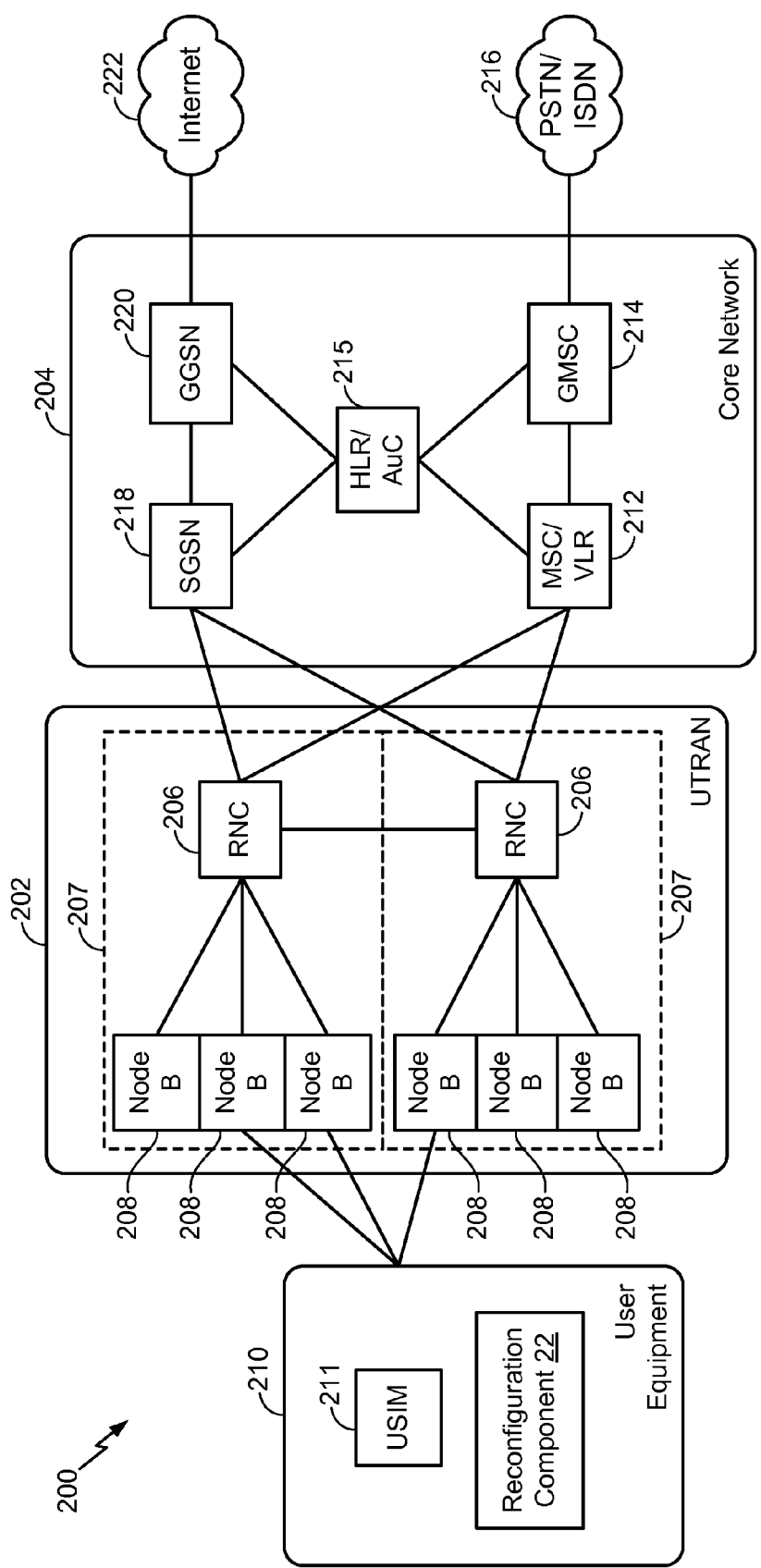
FIG. 6 is a block diagram conceptually illustrating an example of a telecommunications system, according to FIG. 1.

Referring to FIG. 6, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210 that may be the same or similar as UE 12 including reconfiguration component 22 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses, such as UE 210. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
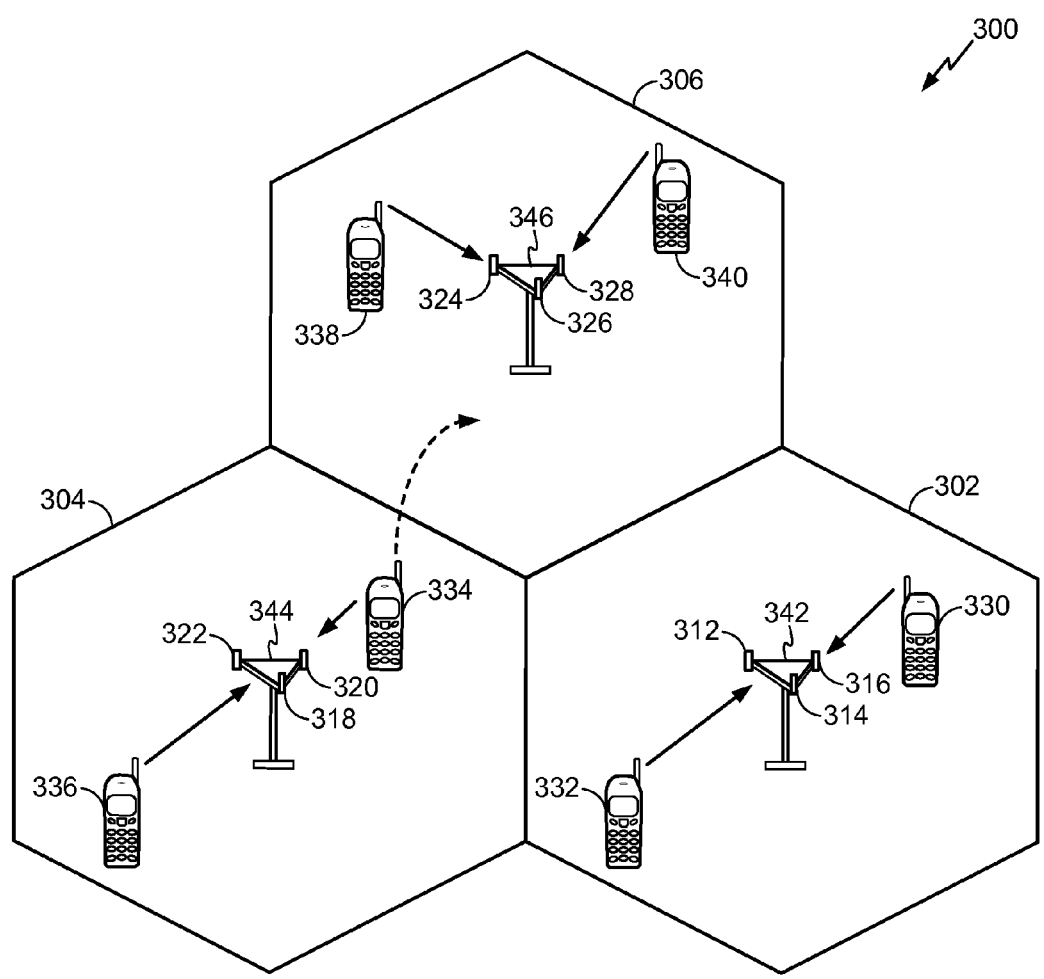
FIG. 7 is a conceptual diagram illustrating an example of an access network including an aspect of the user equipment described herein.

Referring to FIG. 7, an access network 300 in a UTRAN architecture is illustrated in which UE, such as a UE the same as or similar to UE 12 including reconfiguration component 22 (FIG. 1) may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306. In an aspect, the UEs 330, 332, 334, 336, 338 and/or 340 may include reconfiguration component 22 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
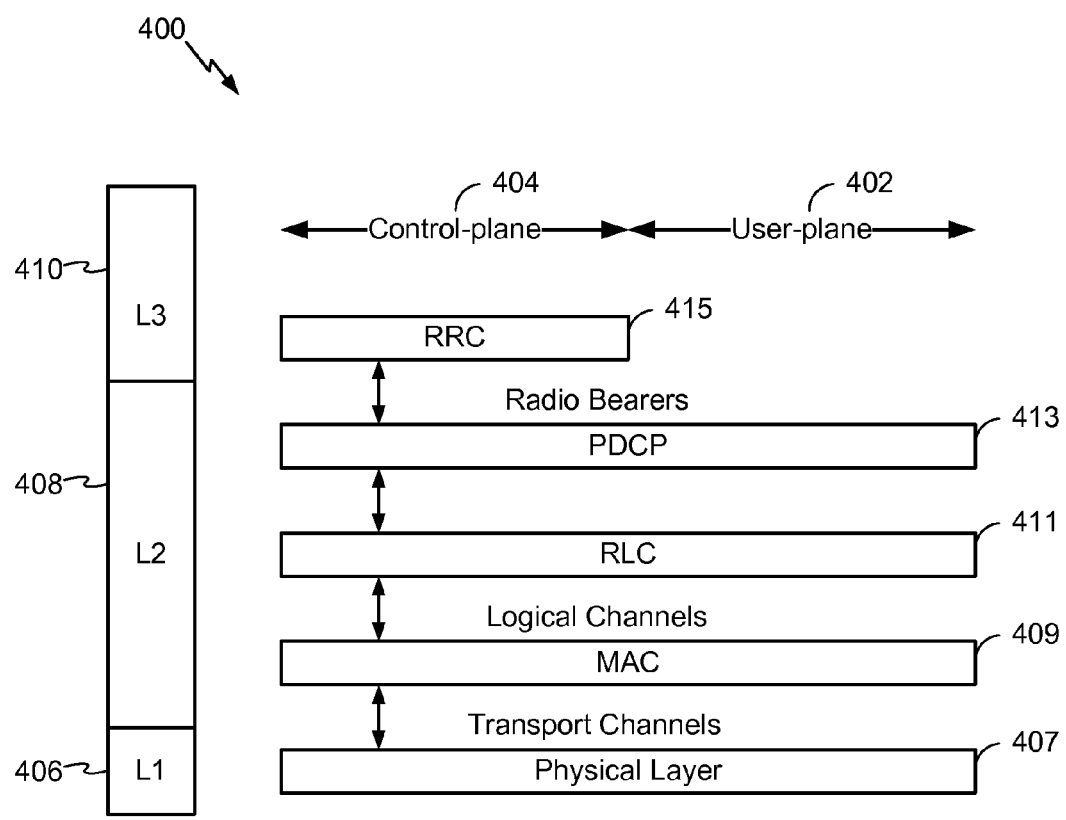
FIG. 8 is a conceptual diagram illustrating an example of a radio protocol architecture for the user and control plane including an aspect of the user equipment described herein.

Referring to FIG. 8, an example radio protocol architecture 400 relates to the user plane 402 and the control plane 404 of a user equipment (UE) or node B/base station. For example, architecture 400 may be included in a UE such as UE 12 including reconfiguration component 22 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
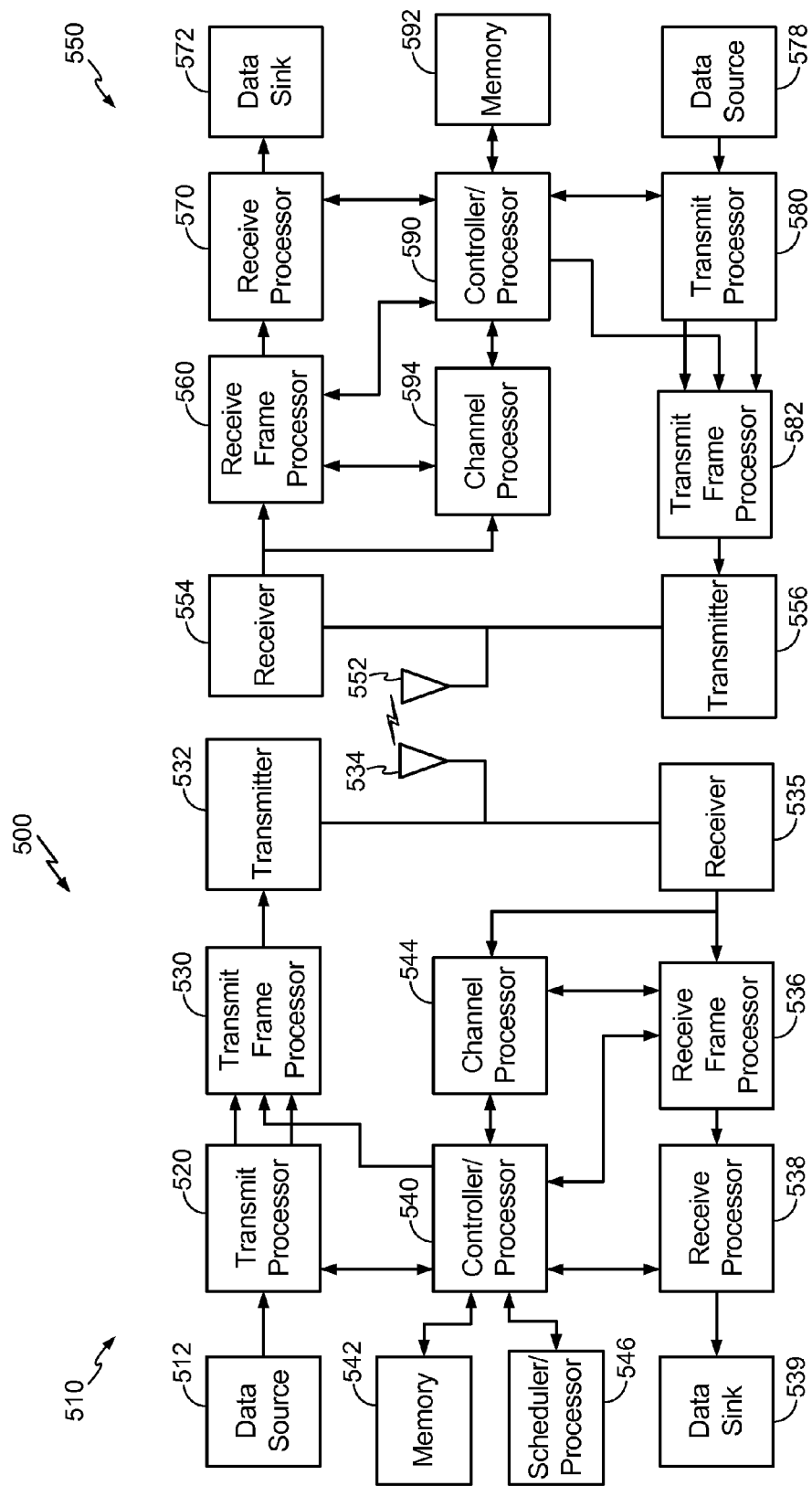
FIG. 9 is a block diagram conceptually illustrating an example of a Node B in communication with a UE in a telecommunications system, according to FIG. 1.

FIG. 9 is a block diagram of a Node B 510 in communication with a UE 550, where the Node B 510 may be the Node B 208 in FIG. 6, and the UE 550 may be the UE 210 in FIG. 6 or the UE 12 including reconfiguration component 22 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of enhanced status retransmission in wireless communication, comprising:
   detecting, at a user equipment, an absence of one or both of signaling radio bearer data or data radio bearer data in a portion of a reconfiguration message, the reconfiguration message being used to reconfigure communication between the user equipment and a network entity;
   triggering, based on detecting the absence of one or both of the signaling radio bearer data or the data radio bearer data in the portion of the reconfiguration message, a status prohibit timer disregard state for at least a portion of a status prohibit time period of a status prohibit timer to increase a transmission rate of retransmission requests communicated to the network entity, wherein the status prohibit timer disregard state disregards the status prohibit timer and permits the sending of a retransmission request during the status prohibit time period; and
   sending the retransmission request to the network entity during an operation of the status prohibit timer for at least the portion of the status prohibit time period and based at least in part on the detecting of the absence of one or both of the signaling radio bearer data or the data radio bearer data in the portion of the reconfiguration message.

2. The method of claim 1, further comprising receiving a retransmitted absent portion of the reconfiguration message in response to sending the retransmission request to the network entity.

3. The method of claim 2, wherein the retransmitted absent portion of the reconfiguration message includes one or both of the signaling radio bearer data or the data radio bearer data.

4. The method of claim 1, wherein the reconfiguration message includes one or more radio link control (RLC) acknowledgment mode (AM) protocol data units (PDU).

5. The method of claim 1, wherein detecting the absence of one or both of the signaling radio bearer data or the data radio bearer data in the portion of the reconfiguration message includes determining one or more missing PDU sequence numbers forming the reconfiguration message.

6. The method of claim 5, wherein detecting the absence of one or both of the signaling radio bearer data or the data radio bearer data in the portion of the reconfiguration message includes determining one or more missing PDUs based at least on a missing PDU indicator, wherein the missing PDU indicator indicates one or both of an approximate duration or an approximate size of the reconfiguration message.

7. The method of claim 1, wherein sending the retransmission request includes sending a status PDU to the network entity.

8. The method of claim 7, wherein the status PDU requests the network entity to retransmit one or both of the signaling radio bearer data or the data radio bearer data that is absent from the reconfiguration message.

9. The method of claim 7, wherein the sending of the status PDU occurs prior to an expiration of the status prohibit time period maintained by the status prohibit timer.

10. The method of claim 1, further comprising repeating the sending of the retransmission request for every defined time interval until a complete reconfiguration message is obtained.

11. A non-transitory computer-readable medium for enhanced status retransmission in wireless communication, comprising:
    at least one instruction for detecting, at a user equipment, an absence of one or both of signaling radio bearer data or data radio bearer data in a portion of a reconfiguration message, the reconfiguration message being used to reconfigure communication between the user equipment and a network entity;
    at least one instruction for triggering, based on detecting the absence of one or both of the signaling radio bearer data or the data radio bearer data in the portion of the reconfiguration message, a status prohibit timer disregard state for at least a portion of a status prohibit time period of a status prohibit timer to increase a transmission rate of retransmission requests communicated to the network entity, wherein the status prohibit timer disregard state disregards the status prohibit timer and permits the sending of the retransmission request during the status prohibit time period; and
    at least one instruction for sending the retransmission request to the network entity during an operation of the status prohibit timer for at least the portion of the status prohibit time period and based at least in part on the detecting of the absence of one or both of the signaling radio bearer data or the data radio bearer data in the portion of the reconfiguration message.

12. The computer-readable medium of claim 11, wherein the at least one instruction for detecting the absence of one or both of the signaling radio bearer data or the data radio bearer data in the portion of the reconfiguration message includes determining one or more missing PDU sequence numbers forming the reconfiguration message.

13. The computer-readable medium of claim 12, wherein the at least one instruction for detecting the absence of one or both of the signaling radio bearer data or the data radio bearer data in the portion of the reconfiguration message includes determining one or more missing PDUs based at least on a missing PDU indicator, wherein the missing PDU indicator indicates one or both of an approximate duration or an approximate size of the reconfiguration message.

14. The computer-readable medium of claim 11, wherein the at least one instruction for sending the retransmission request includes sending a status PDU to the network entity.

15. The computer-readable medium of claim 14, wherein the status PDU requests the network entity to retransmit one or both of the signaling radio bearer data or the data radio bearer data that is absent from the reconfiguration message.

16. The computer-readable medium of claim 14, wherein the at least one instruction for sending the status PDU occurs prior to an expiration of the status prohibit time period maintained by the status prohibit timer.

17. An apparatus for enhanced status retransmission in wireless communication, comprising:
    means for detecting, at a user equipment, an absence of at least one or both of signaling radio bearer data or data radio bearer data in a portion of a reconfiguration message, the reconfiguration message being used to reconfigure communication between the user equipment and a network entity;
    means for triggering, based on detecting the absence of one or both of the signaling radio bearer data or the data radio bearer data in the portion of the reconfiguration message, a status prohibit timer disregard state for at least a portion of a status prohibit time period of a status prohibit timer to increase a transmission rate of retransmission requests communicated to the network entity, wherein the status prohibit timer disregard state disregards the status prohibit timer and permits the sending of the retransmission request during the status prohibit time period; and means for sending the retransmission request to the network entity during an operation of the status prohibit timer for at least the portion of the status prohibit time period and based at least in part on the detecting of the absence of one or both of the signaling radio bearer data or the data radio bearer data in the portion of the reconfiguration message.

18. The apparatus of claim 17, wherein the means for detecting the absence of one or both of the signaling radio bearer data or the data radio bearer data in the portion of the reconfiguration message includes means for determining one or more missing PDU sequence numbers forming the reconfiguration message.

19. The apparatus of claim 18, wherein the means for detecting the absence of one or both of the signaling radio bearer data or the data radio bearer data in the portion of the reconfiguration message includes means for determining one or more missing PDUs based at least on a missing PDU indicator, wherein the missing PDU indicator indicates one or both of an approximate duration or an approximate size of the reconfiguration message.

20. The apparatus of claim 17, wherein the means for sending the retransmission request includes means sending a status PDU to the network entity.

21. The apparatus of claim 20, wherein the status PDU requests the network entity to retransmit one or both of the signaling radio bearer data or the data radio bearer data that is absent from the reconfiguration message.

22. The apparatus of claim 20, wherein the means for sending the status PDU occurs prior to an expiration of the status prohibit time period maintained by the status prohibit timer.

23. An apparatus for enhanced status retransmission in wireless communication, comprising:
   a processor having a reconfiguration message detection component configured to detect, at a user equipment, an absence of one or both of signaling radio bearer data or data radio bearer data in a portion of the reconfiguration message, the reconfiguration message being used to reconfigure communication between the user equipment and a network entity, and further configured to trigger, based on a detection that the absence of one or both of the signaling radio bearer data or the data radio bearer data in the portion of the reconfiguration message, a status prohibit timer disregard state for at least a portion of a status prohibit time period of a status prohibit timer to increase a transmission rate of retransmission requests communicated to the network entity, wherein the status prohibit timer disregard state disregards the status prohibit timer and permits the sending of the retransmission request during the status prohibit time period; and
   wherein the processor further includes a retransmission request component configured to send the retransmission request to the network entity during an operation of the status prohibit timer for at least the portion of the status prohibit time period and based at least in part on the detection of the absence of one or both of the signaling radio bearer data or the data radio bearer data in the portion of the reconfiguration message.

24. The apparatus of claim 23, further comprising a receiver configured to receive a retransmitted absent portion of the reconfiguration message in response to sending the retransmission request to the network entity.

25. The apparatus of claim 24, wherein the retransmitted absent portion of the reconfiguration message one or both of the signaling radio bearer data or the data radio bearer data.

26. The apparatus of claim 23, wherein the reconfiguration message includes one or more radio link control (RLC) acknowledgment mode (AM) protocol data units (PDU).

27. The apparatus of claim 23, wherein to detect the absence of one or both of the signaling radio bearer data or the data radio bearer data in the portion of the reconfiguration message, the reconfiguration message detection component is further configured to determine one or more missing PDU sequence numbers forming the reconfiguration message.

28. The apparatus of claim 27, wherein to detect the absence of one or both of the signaling radio bearer data or the data radio bearer data in the portion of the reconfiguration message, the reconfiguration message detection component is further configured to determine one or more missing PDUs based at least on a missing PDU indicator, wherein the missing PDU indicator indicates one or both of an approximate duration or an approximate size of the reconfiguration message.

29. The apparatus of claim 23, wherein to send the retransmission request, the retransmission request component is further configured to send a status PDU to the network entity.

30. The apparatus of claim 29, wherein the status PDU requests the network entity to retransmit one or both of the signaling radio bearer data or the data radio bearer data that is absent from the reconfiguration message.

31. The apparatus of claim 29, wherein the retransmission request component is configured to send the status PDU occurs prior to an expiration of the status prohibit time period maintained by the status prohibit timer.

32. The apparatus of claim 23, wherein the retransmission request component is configured to repeat the sending of the retransmission request for every defined time interval until a complete reconfiguration message is obtained.

33. The method of claim 1, further comprising:
   determining a presence of each one of one or both of the signaling radio bearer data or the data radio bearer data of the reconfiguration message, wherein the presence of each one of one or both of the signaling radio bearer data or the data radio bearer data forms a complete reconfiguration message prior to the expiration of at least the portion of the status prohibit time period; and
   deactivating the status prohibit timer disregard state based on determining the presence of each of one or both of the signaling radio bearer data or the data radio bearer data of the reconfiguration message.

* * * * *